Patented May 17, 1949

2,470,142

UNITED STATES PATENT OFFICE 2,470,142

PRODUCTION OF CATALYSTS OF THE SILICA-ALUMINA TYPE

Charles C. Chapman, near Oklahoma City, Okla., and Hurshel V. Hendrix, Borger, Tex., assignors to Phillips Petroleum Company, a corporation of Delaware No Drawing. Application November 20, 1943, Serial No. 511,184

4 Claims. (Cl. 252—451)

This invention relates to the preparation of catalytic materials, and it relates more particularly to improved catalysts of the silica-alumina type comprising or consisting of silica and an oxide of a metal selected from the aluminum subgroup of group III or from the titanium subgroup of group IV of the periodic system of elements and to the preparation and use of such catalysts. It relates still more particularly to a silica-alumina catalyst suitable for polymerization of low-boiling olefin hydrocarbons, and for the cracking and dehydrogenation of hydrocarbons.

This application is a continuation-in-part of our prior copending application Serial No. 371,209, filed December 21, 1940, which has issued as Patent No. 2,342,196.

Heretofore in the preparation of catalysts of the silica-alumina type, an acid hydrogel such as hydrous silica gel is first prepared, and before it is thoroughly dried or dehydrated, it is treated with an aqueous solution of a suitable metal salt. While the resultant product, after washing and drying, appears to consist of or comprise a mixture of silica and an oxide of the metal of the metal salt solution, nevertheless, this same product has not resulted from precipitation of a metal hydroxide or hydrous oxide upon an inert support, nor from the impregnation of a dried inert support with a metal salt and subsequent decomposition of the metal salt or precipitation of a decomposable compound from the metal salt, as when thoroughly dried pumice or silica gel is impregnated with aluminum nitrate and the resultant material is calcined or treated to precipitate aluminum as the hydroxide or carbonate or the like and subsequently calcined. Such catalytic materials comprising silica and various metal oxides have been described by Gayer (Industrial and Engineering Chemistry, 1933, vol. 25, page 1122), Perkins et al. (U. S. Patent No. 2,107,710), McKinney (U. S. Patents No. 2,142,324 and 2,147,985), Fulton and Cross (U. S. Patents No. 2,129,649; 2,129,732 and 2,129,733), and in our copending application (Patent No. 2,342,196) and in the copending application of Karl H. Hachmuth, Serial No. 370,558, filed December 17, 1940 (Patent No. 2,349,904).

In general, catalysts of the silica-alumina type are prepared by first forming a silica gel or jelly from sodium silicate or other alkali-metal silicate and an acid, washing soluble material from the gel, partially drying the gel, treating or activating the partially dried gel with an aqueous solution of a suitable metal salt, and subsequently washing and drying the activated material. In this manner, a part of the metal, presumably in the form of a hydrous oxide or loose hydroxide compound formed by hydrolysis, is selectively adsorbed by the hydrous silica and is not removed by subsequent washing. This selective adsorption is attested by a decrease in the metal content of the activating solution as well as a decrease in pH as the activation progresses. The most often used catalyst of this type, at present, is a silica-alumina catalyst, prepared by treating a wet or partially dried hydrous silica gel with an aluminum salt solution, such as a solution of aluminum chloride or aluminum sulfate, and subsequently washing and drying the treated material. However, catalysts of a very similar nature, but differing among themselves as to one or more specific properties, may be prepared by using, instead of an aluminum salt, a hydrolyzable salt of a metal selected from group IIIB or from group IVA of the periodic system, and may be referred to in general as catalysts of the silica-alumina type. More particularly, salts of indium and thallium in addition to aluminum in group IIIB may be used, and salts of titanium, zirconium and thorium in group IVA may be used to treat silica gel and to prepare catalysts of this general type. Boron in the form of boric acid, or a soluble borate such as sodium borate, may be incorporated with the silica gel.

Catalysts of the silica-alumina type, whether prepared as described hereinabove or in the prior art or by the improved methods hereinafter described, are useful in processes for the polymerization of unsaturated organic compounds, especially for the polymerization of low-boiling olefin hydrocarbons, in either gaseous, vapor or liquid phase, for the depolymerization of higher-boiling polymers, for the cracking and splitting of higher-boiling hydrocarbons to form lower-boiling hydrocarbons, for the reforming of gasoline and naphtha stocks, for the hydrolysis of alkyl and aryl halides at elevated temperatures, for the addition of certain halogens and hydrogen halides to unsaturated compounds, for the splitting out of a hydrogen halide from an alkyl halide, and the like. Whether prepared by the improved methods of the invention or otherwise, the catalyst will generally contain a major portion of silica and a minor portion of metal oxide. This minor portion of metal oxide, such as alumina, will generally not be substantially in excess of 10% by weight, and will more often and preferably, be between 0.1 and 1.5 or 2% by weight of the catalyst.

Great difficulties are encountered in the preparation of catalysts of the silica-alumina type. It is frequently difficult to duplicate batches of the catalytic materials and even to obtain catalysts of the same relative activities from the same batch. Some of these difficulties or lack of uniformity of different catalyst batches are traceable to differences in raw materials but, more often, they are due to slight variations in the various operations that were used in the preparation of the catalyst and failure of proper control of certain of these operations, since catalysts prepared from the same raw materials may differ widely in catalytic activities. Sometimes a catalyst possesses remarkable activity when tested in the laboratory but proves not to possess such activity in plant operation, thus indicating that laboratory tests are not to be relied upon too conclusively unless the test itself simulates actual operating conditions and the catalysts which are compared have been prepared according to substantially identical procedures.

It is an object of the present invention to provide a process capable of producing catalysts of the silica-alumina type that possess high and relatively uniform activities both between samples from various catalyst batches and between samples from the same batch.

A further object of the invention is to provide an improved catalyst of the silica-alumina type that is characterized by high catalytic activity and other desirable properties and to provide a method for the preparation of such a catalyst.

Other objects and advantages of the invention, some of which are specifically referred to hereinafter, will be apparent to those skilled in the art to which the invention appertains.

We have found that, in order to provide catalysts of the silica-alumina type that are characterized by high catalytic activity and other desirable properties and that are of great uniformity throughout the batch and from batch to batch, it is necessary to control certain of the steps in the preparation much more carefully and closely than others and that some of the limits within which certain of the steps must be controlled are so narrow as to amount almost to specificity, that is, unless the particular operation is conducted so as to fall within the specified narrow limits, the catalyst is of poor activity, regardless of how carefully other limits are observed in other steps of the process.

In accordance with one specific preferred embodiment of the invention, a silica-alumina catalyst is prepared in five steps as follows:

(1) *Precipitation of silica gel*

Aqueous solutions of sulfuric acid and sodium silicate are prepared. The concentration of these solutions is such that the sulfuric acid solution has a specific gravity of 21° Baumé and the sodium silicate solution has a specific gravity of 22° Baumé.

The sodium silicate solution is then added to a predetermined amount of the sulfuric acid solution with constant stirring and in such manner that the temperature during the addition of the sodium silicate solution to the acid does not exceed approximately 80° F. The proportions in which the solutions are mixed is approximately 25 parts by volume of 21° Baumé sulfuric acid solution to approximately 22 parts by volume of the 22° Baumé sodium silicate solution. After the solutions are mixed the gel is allowed to set. After setting, the gel is preferably subjected to a further hardening or aging period of approximately 4 to 24 hours.

The resulting gel will be homogeneous and clear and gelatinous, not cloudy or granular, and will not contain any substantial amount of granular or cloudy or opaque particles distributed throughout.

(2) *Washing of hydrous silica gel*

The raw gel is then washed with water at a temperature below approximately 80° F. until the pH of the wash water is within the range of 2.0 to 2.15, and the pH of the gel is correspondingly increased.

(3) *Drying and washing of silca gel*

The washed silica gel is thereafter dried to a moisture content within the range of approximately 10 to approximately 15 or 16% by weight.

The dried gel is then washed with water at a temperature below 80° F. until the pH of the wash water is approximately 3.0 or higher.

(4) *Activation of silica gel and washing of activated silica gel*

The silica gel which was washed and dried and again washed as above described is then subjected to activation by circulating a hot or boiling aqueous aluminum sulfate solution at a temperature of approximately 210° F. through a bed of the gel for a period of almost two hours. The solution which is used is prepared by dissolving aluminum sulfate in water in the proportion of approximately 1.2 pounds of aluminum sulfate (anhydrous $Al_2(SO_4)_3$) or an equivalent amount of crystalline aluminum sulfate per gallon of solution. Such a solution is approximately 0.42 molar. The spent activating solution is then drained from the gel and the gel is washed with water at a temperature below 80° F. until the pH of the wash water is within the range of approximately 2.8 to approximately 3.4.

The activating and washing treatments are each repeated two more times, the washing the second time being continued until the pH of the wash water is within the range of approximately 3.0 to approximately 4.0 and the third time, following the third activation treatment, until the wash water has a pH within the range of approximately 3.0 to approximately 4.7.

(5) *Drying of activated gel (silica-alumina catalyst)*

After the silica gel has been activated with aluminum sulfate solution and washed as above described it is then dried until the moisture content is approximately 7 to 8% by weight of the gel.

Further details of the various steps and the variations and alternatives which may be used in the practice of the invention are described hereinafter.

For purposes of comparison, the activities of the catalysts are expressed as "cc./4 hours" which is to be understood to designate the number of cubic centimeters of polymer produced in a four-hour test period when pure propylene is passed over a standard test portion (5 cc.) of the catalyst under standardized conditions of flow rate, temperature, and pressure. While this test has considerable value in evaluating catalytic activity, it does not necessarily represent an ordinary hydrocarbon conversion process, or even an ordinary olefin polymerization process, as to possible charge stock or operating temperature, or the like. It has been found by repeated comparative tests and runs that a catalyst which has a good activity in such a test will have a good activity in various processes although under considerably different operating conditions.

The wash water which is used in the various washing procedures of the process of the invention should preferably be free of iron and other catalyst "poisoning" substances and should be neutral, or slightly acid (that is, have a pH within the range of 3.0 to 6.0 if inorganic materials are present), as described in the copending application of Frederick E. Frey, Serial No. 329,195, filed April 11, 1940 (now abandoned). Natural waters having a hardness of approximately 1.5 grains per gallon or less and a pH of approximately 7.4 produce a decrease in activity of the catalyst but the decrease is so slight that economically it is not feasible to substitute steam condensate or purer water for the purpose of washing the catalyst. For reasons set forth hereinafter, the washing is conducted at temperatures not substantially in excess of 80° F.

(1) *Precipitation of silica gel*

The concentration of the sodium silicate and acid solutions which are used to precipitate the hydrous gel determine to a great extent the characteristics of the precipitated gel and the mechanical properties of the catalyst resulting therefrom.

It is preferred to effect the precipitation by addition of the sodium silicate solution to the acid solution, because of ease of handling and because the characteristics of the gel are more easily controlled.

When concentrated sodium silicate solutions are used (39° to 40° Baumé commercial solutions), the precipitated silica gel has a tendency to be flocculent and to settle to the bottom of the acid bath, producing a gel which sets at the bottom of the bath and leaves a substantial amount of supernatant liquid above the surface of the set gel. Upon drying, the resulting gel is granular and crumbles rather than fractures. Dilute sodium silicate solutions (for example, 9.4° Baumé solutions) produce gels which take very long periods to set and which never do set very firmly. Generally sodium silicate solutions having a specific gravity between the range of approximately 15° to approximately 28° Baumé produce the best gels, that produced with approximately 22° Baumé sodium silicate solution being preferred. Such gels set reasonably fast and have good physical characteristics and catalytic activity. The precipitation with solutions of 28° Baumé solutions is difficult to effect because of difficulties in stirring. Variation of the characteristics of the gels with changes in the concentration of the sodium silicate solution used in the precipitation is shown in the following table:

| Silicate Solution Concentration, ° Baumé | Setting Time | Physical Properties Of Gel | Catalyst Density (Apparent), g./cc. | Activity cc./4 hours |
|---|---|---|---|---|
| | Hours | | | |
| 39.2 | 1 | Crumbles | 0.37 | 4.6 |
| 26.2 | 1 | Hard, clear | 0.64 | 4.2 |
| 22.0 | 2 | do | 0.69 | 3.6 |
| 18.1 | 4½ | Good, clear | 0.63 | 3.2 |
| 15.2 | 10 | do | | 4.0 |
| 12.8 | 21 | Soft, clear | 0.69 | 4.0 |
| 9.4 | 72 | do | 0.73 | 4.5 |

The preferred acid solution is sulfuric acid of approximately 21° Baumé strength. Gels made from such acid possess the optimum characteristics. Increasing the acid concentration produces a decrease in the activity of the resulting catalysts. Other acids such as hydrochloric acid may be used instead of sulfuric acid, if desired, in which event somewhat different concentrations will be found to be most advantageous.

Approximately 22 parts by volume of 22° Baumé sodium silicate solution should be added to approximately 25 parts by volume of 21° Baumé sulfuric acid solution. This is a slight excess of acid over that required stoichiometrically for the precipitation. Such a proportion or mixing ratio produces gels which have the shortest setting time, most desirable physical properties and optimum catalytic activity. Decrease of the proportion of acid increases the setting time and results in catalysts of lesser activity. Increase of the proportion of acid also lengthens the setting time but does not produce a substantial increase or decrease in the activity of the catalyst. The effects of variation of the proportions of acid and sodium silicate solutions is illustrated by the results in the following table:

| Volumes of Acid per 400 Volumes of Silicate Solution | Setting Time | Physical Properties of Gel | Activity cc./4 hours |
|---|---|---|---|
| | Hours | | |
| 150 | 6 | Soft, clear | 3.6 |
| 200 | 4 | do | 4.0 |
| 250 | 3 | Firm, clear | 4.1 |
| 300 | 2 | Good, clear | 3.9 |
| 350 | 1½ | do | 4.5 |
| 400 | 2 | do | 4.5 |
| 450 | 2½ | Firm, clear | 4.0 |
| 500 | 3 | do | 4.6 |
| 600 | 4 | Soft, clear | 3.8 |

After setting, the gel may be and preferably is allowed to age or harden from approximately 4 to 24 hours or more.

The above table indicates that by the use of relative proportions of acid to silicate corresponding to about 250 to about 500 volumes of 21° Baumé sulfuric acid to 400 volumes of 22° Baumé sodium silicate solution a catalyst having the optimum activity and physical properties is assured.

Catalysts which are cloudy and not clear apparently contain agglomerates. These agglomerates, when picked from the catalyst mass, are decidedly inferior in catalytic activity to the remainder of the mass. The formation of cloudy catalysts is generally caused by the temperature during the mixing of the sodium silicate and acid solutions being allowed to rise beyond approximately 80° F. Although the variations in the concentrations and proportion of sodium silicate and acid solutions is rather large, the permissible variation in the temperature of mixing is relatively small, as indicated hereinabove. Using 22° Baumé sodium silicate solution and 21° Baumé sulfuric acid, the effect of mixing temperatures as high as 105° F. has been observed numerous times and no apparent deleterious effect on the characteristics of the gel has resulted. Mixing temperatures as high as 95° F. are permissible although the lower temperature of 80° F. is preferred as an upper limit.

The temperature during the mixing of the solutions should not be allowed to increase beyond approximately 80° or 95° F. The gel will set faster as the temperature is increased and will have a lower apparent specific gravity but the characteristics of the gels are poor and they are cloudy in appearance when allowed to set at a temperature above approximately 80° F. Gels that were allowed to set at 160° F. and 201° F. crumbled upon handling rather than fracturing and exhibited a tendency to "slime," that is, they did not form firm masses and portions were washed away in the washing procedure; such gels also caked on drying and the dried material crumbled readily to a powder. The activity of the resulting gel was also lower the higher the temperature of setting. These results are illustrated in the following table:

| Mixing Temperature | Setting Time | Physical Properties | Activity cc./4 hours |
|---|---|---|---|
| 37° F | 90 min | Good | 3.5 |
| 80° F | 68 min | do | 5.5 |
| 120° F | 56 min | Fair | 4.5 |
| 160° F | 50 min | Poor | 3.1 |
| 201° F | Immediately | do | 2.0 |

During the precipitation it is important to avoid local concentration of the reactants, for example, in splashing on the sides of the tank, and to have effective stirring or agitation, otherwise curds will form. A catalyst made from curds is approximately one-third as active as catalysts made from clear gel.

Instead of sodium silicate, a solution of potassium silicate or other alkali-metal silicate may be used, in which event a suitable adjustment of concentration of the solution should be made to obtain a clear hydrous gel that set readily.

(2) *Washing of hydrous silica gel*

After the gel has set, it contains excess sulfuric acid or other acid which was used for the precipitation and salts such as sodium sulfate which resulted from the neutralization. The gel is preferably broken before washing by being forced through a screen of coarse mesh, for example, a screen with holes one-inch in diameter. Wash water is then passed up through the gel, which may be contained in a wash tank and allowed to overflow by means of a weir elevated above the surface of the gel, until the pH of the effluent water is within the range of approximately 2.0 to approximately 2.15, although the difference in activity of the resulting catalyst is not great when the wash water is on either side of this range; that is, in general, the wash water may have a pH within the range of approximately 2.0 to approximately 2.5 or higher, namely, 2.6 to 3.5 or 2.5 to 5.0, as specified in our application Serial No. 371,209 (Patent No. 2,342,196). Washing with insufficient water, that is, so the effluent wash water has a lower pH than approximately 1.5, as well as overwashing, produce a lowering of catalytic activity.

The wash water which is used should preferably be at a temperature not substantially in excess of approximately 80° F. The reasons for maintaining the temperature below this maximum are set forth more specifically hereinafter.

(3) *Drying and washing of silica gel*

During the drying operation, the hydrous silica gel as herein prepared shrinks to from approximately 15 to approximately 25% of its original volume and loses approximately 80 to 85% of its weight. The acid and salts that remain in the hydrous gel after the washing procedure are concentrated in the pores of the gel during the drying and these are subsequently washed out in the washing step which precedes the activation treatment (4).

The drying step is conducted so as to obtain a product with a moisture content within the range of approximately 10 to approximately 16% by weight, the moisture being determined by loss of weight on heating the gel at 270° F. for 16 hours. During the drying the gel will crepitate when the moisture content is within the range of 2 to 16% and the most violent crepitation will take place when the moisture content is approximately 10%.

Any suitable means for drying may be used, for example, the gel may be placed in hard-rubber trays which are then placed in a drying cabinet or room that is heated by steam coils and that is provided with fans to obtain an induced circulation of hot air over the gel. Under such drying conditions, there is not much danger of overdrying and the degree of drying can be fairly well estimated by the crepitation and feel of the dried material.

The washing of the dried gel is conducted by placing the gel in a suitable tank or vat, filling the tank with water, removing from the tank a stream of water, adding fresh water to the tank at substantially the same rate as water is so removed, and also removing another stream of water and returning or recirculating it to the tank in such a manner that there is a more or less constant and continuous flow of water through the mass of gel contained therein. This method may be applied to the washing of the gel after activation but it has been found that the washing of the activated gel with water by means of recirculation only is sufficient to maintain the pH requirements.

The recirculation of wash water may be accomplished by any suitable pumping means. Although we have practiced this recirculation by using an ordinary small pump, the simplest and most effective means we have employed in actual practice to recirculate the water has been a steam jet. To this jet was supplied water from the bottom of the tank in one or more streams and fresh water in another stream, the combined streams being forced by the jet to the top of the tank. Water was discharged from the system through an overflow at the top of the tank. In such a washing operation, the amount of fresh water added to the system should be between approximately 0.25 and approximately 2.5 volumes of fresh water per volume of gel being washed per hour, and the ratio of recirculated water to fresh water should be between approximately 1:1 and approximately 10:1.

The washing at this point is conducted to a pH of approximately 3.0 or more. The pH of the wash water increases slowly as washing progresses and, after it reaches a pH of 3.0, further washing produces a rapid increase in the pH. Although the pH increases rapidly on further washing, there is no substantial improvement in the activity of the catalyst as a result of continued washing. The washing of the dried gel should generally be stopped when the pH of the wash water is within the range of approximately 3.0 to approximately 6.0, as stated in our application, Serial No. 371,209 (Patent No. 2,342,196). Overwashing at this point is not detrimental to the activity of the catalyst.

When the washing is stopped at a point when the pH of the wash water is less than 3.0, the activity of the resulting catalyst is very poor. For example, catalysts prepared in exactly the same manner except that the washings of the dried gels were stopped at different pH values had approximately the following activities:

| pH of Wash Water | Activity cc./4 hours |
|---|---|
| 0.5 | 0.4 |
| 1.3 | 3.5 |
| 3.0 | 4.2 |
| 4.5 | 4.2 |
| 6.2 | 4.2 |

The wash water should be at a temperature not substantially in excess of 80° F. since it has been found that there is a gradual decrease of activity with increase of the temperature at which the washing is conducted. Furthermore, washing at a higher temperature requires a greater amount of water and a longer period of washing to obtain the desired pH value of 3.0 or more.

(4) *Activation of silica gel and washing of activated silica gel*

The dried and washed gel is then subjected to activation with an aqueous solution of a hydrolyzable salt of aluminum such as aluminum chloride or aluminum sulfate. The concentration of the salt may be varied but, inasmuch as the gel will take up only a limited amount of activity at each treatment, it is generally undesirable to use solutions more concentrated than approximately 1.0 molar, and preferably not more than 0.5 molar. The gel generally takes on as much activity as is desirable after three treatments, hence it is usually not advantageous to subject it to more than three treatments inasmuch as a loss of activity may occur in some cases upon further treatment. The increase in activity as a result of repeated treatments with aluminum sulfate solution (1 pound $Al_2(SO_4)_3$ per gallon) is shown in the following typical results:

| Number of Treatments | Activity cc./4 hours |
|---|---|
| 1 | 3.3 |
| 2 | 5.8 |
| 3 | 6.7 |
| 4 | 7.3 |

The activating treatments with aluminum salts may be conducted as follows:

After the washing of the dried silica gel is completed, the water is drained from the tank and a suitable hydrolyzable salt of a metal of group IIIA or IVB, as hereinabove described, is added to the tank until the solution level is above the catalyst mass. This solution is preferably free of iron and contaminants of like nature, and should have a strength of about 0.05 to 1.0 molar. The activation of the silica gel with this solution is carried out with a recirculation of the solution in a manner similar to that described hereinbefore for the recirculation of wash water, that is, a stream of the solution is removed from the tank at one point and returned to another point in a manner such as to set up a general flow through the entire catalyst mass. While a portion of the activating solution may be discharged, being replaced by fresh activating solution, this is not necessary in most instances. The activation is preferably carried out at an elevated temperature, at or near the boiling point of the solution. Although even higher temperatures may be used, in a closed system under suitable pressure, the added expense for pressure equipment and operation generally does not make this worthwhile. The heating and maintenance of a suitable activating temperature may be carried out by any suitable means, such as by passing steam through coils in the tank and/or direct injection of steam. The use of a steam jet to circulate the activating solution has the added advantage of supplementing the supply of heat to the system. However, excessive dilution by directly injected steam is to be avoided.

The activation treatment should be carried out for an appreciable period, such as about 20 or 30 minutes to several hours, during which time the concentration of the metal of the metal salt used and the pH of the treating solution decrease. We have found that an activating period of about two hours is suitable for the preparation of a silica-alumina catalyst for olefin polymerization, but longer or shorter periods may be used.

After the gel has been treated, or activated, it must be washed. This can be done by draining off the activating solution and washing the activated gel without removing it from the tank. Improved results are obtained if this washing is also carried out with a flow of water through the catalyst mass and a recirculation of a portion or all of the effluent wash water, as hereinabove described. The wash water in this instance is generally near or only somewhat above ordinary atmospheric temperature, that is, not substantially higher than approximately 80° F. This washing is continued until the effluent wash water has a pH within the range of approximately 2 to approximately 5, and preferably within the range of 2.8 to 3.4.

The activation and washing treatments are repeated with fresh solutions of aluminum salts but the washing treatment is conducted to such a point that, after the second treatment, the pH of the effluent wash water is preferably within the range of 3.0 to 4.0; and, after the third activation treatment, that the pH of the effluent wash water is preferably within the range of 3.0 to 4.7.

In the event that a catalyst of only moderate activity is desired, one or two of the three successive activation treatments may be omitted, as is obvious.

Gels have heretofore been prepared by coprecipitation of the silica and alumina together, for example, by dissolving the aluminum salts such as aluminum chloride and aluminum sulfate in acid and thereafter adding sodium silicate solution to the acid solution. Such catalysts were always cloudy and crumbled. Catalysts prepared by such procedures have exhibited some catalytic activity but such catalysts could always be improved in activity by subjecting them to the subsequent action of a solution of an aluminum salt according to the conventional method for activating silica gel catalysts.

(5) *Drying of activated gel (silica-alumina catalyst)*

After the third washing of the activated gel has been completed, the gel is then dried to a moisture content of less than 10% and preferably approximately 7 to approximately 8% by weight, as determined by heating at 270° F. for 16 hours. This drying may be conducted as described hereinabove with reference to drying of the hydrous silica gel and should not be carried out at too high an elevated temperature. If it is dried at a low temperature, below approximately 225° F., as disclosed in the copending application of Karl H. Hachmuth, Serial No. 370,558, filed December 17, 1940 (Patent No. 2,349,904), it will initiate a desired polymerization of low-boiling unsaturated hydrocarbons at a low temperature.

It is to be noted that the following are some of the important and critical steps in the process of preparing catalysts of the silica-alumina type, as hereinabove stated:

1. Precipitation of a clear hydrous silica gel by control of concentrations of sodium silicate and acid solutions and the temperature of mixing and the avoidance of the formation of dense flocculent gels, cloudy gels and curds.

2. Washing the precipitated hydrous silica gel to a specified extent and the avoidance of overwashing.

3. Drying the hydrous silica gel to a specified moisture content and avoidance of overdrying.

4. After washing of the dried gel, subjecting said gel to three treatments with activating solutions and washing of the activated gel after each successive treatment to a specified extent.

5. Drying of said activated gel to a specified extent and avoidance of overdrying and drying at a detrimental temperature.

Various modifications of catalyst preparations have been disclosed herein, and the effects of changing various factors have been described. While a preferred procedure has been outlined in detail, it is, of course, understood that various modifications may be applied in any particular case in the light of the present disclosure without going outside the teachings, or spirit, of the invention. Although, in this specification, specific details have been stated for the preparation of silica-alumina catalysts, it is obvious that such procedures are applicable to the preparation of other catalysts of this type, namely, silica gels activated by metals other than aluminum and selected from the group consisting of elements of groups IIIB and IVA of the periodic system.

We claim:

1. In a process for the preparation of a silica-alumina catalyst, which comprises forming a hydrous silica gel by adding a solution of sodium silicate to an aqueous acid solution, washing and partially drying said hydrous silica gel, washing said partially dried gel, thereafter subjecting the resulting washed gel to the action of an activating solution comprising aluminum sulfate, and subsequently washing and drying said activated gel, the improvement which comprises forming the hydrous silica gel by the addition of a solution of sodium silicate which has a concentration of approximately 22° Baumé gravity to a solution of sulfuric acid which has a concentration of approximately 21° Baumé gravity in the relative proportions of acids to silicate corresponding to about 250 to about 500 volumes of 21° Baumé sulfuric acid to about 400 volumes of 22° Baumé sodium silicate solution and maintaining the temperature during the mixing of the two solutions and setting of the gel below approximately 95° F., thereafter washing the hydrous silica gel until the pH of the effluent wash water is within the range of approximately 2.0 to approximately 2.15, drying the washed raw silica gel to a moisture content within the range of approximately 10 to approximately 16% by weight, washing said partially dried gel until the effluent wash water has a pH in excess of 3.0, subjecting said washed partially dried gel to the action of an aqueous activating solution comprising an 0.05 to 1.0 molar solution of aluminum sulfate, thereafter washing said activated gel until the pH of the effluent wash water is within the range of approximately 2.8 to approximately 3.4 and twice repeating said activation and washing treatments, the washing after the second activation being conducted until the effluent wash water has a pH within the range of approximately 3.0 to approximately 4.0 and the third washing after the third activation until the effluent wash water has a pH within the range of approximately 3.0 to approximately 4.7.

2. A process for the preparation of an activated silica-metal oxide catalyst which comprises forming a hydrous silica gel by the addition of a solution of sodium silicate which has a concentration within the range of approximately 15° to 28° Baumé gravity to a solution of sulfuric acid which has a concentration of approximately 21° Baumé gravity in proportions such that there is a slight stoichiometric excess of acid sufficient to produce a gel of a pH less than 2, maintaining the temperature during the mixing of the two solutions and the resultant setting of the gel below approximately 95° F., washing the resultant gel until the pH of the wash water is within the range of about 2.0 to 5.0, drying the washed silica gel to obtain a product with a moisture content within the range of about 10 to 16% by weight, activating the washed and partially dried gel by subjecting it to at least two activation and washing treatments with an aqueous activating solution comprising an 0.05 to 1.0 molar solution of a hydrolyzable salt of a metal selected from groups IIIB and IVA of the periodic system, each activation treatment being followed by washing to increase the pH of the gel, said washing being conducted so that after the first washing following the first activation the pH of the effluent wash water is within the range of approximately 2.8 to approximately 3.4, and after the second washing following the second activation the pH of the effluent wash water is within the range of approximately 3.0 to approximately 4.0, and drying the activated gel to a moisture content below about 10%.

3. A process for the preparation of an activated silica-alumina catalyst which comprises forming a hydrous silica gel by the addition of a solution of sodium silicate which has a concentration within the range of approximately 15° to 28° Baumé gravity to a solution of sulfuric acid which has a concentration of approximately 21° Baumé gravity in proportions such that there is a slight stoichiometric excess of acid sufficient to produce a gel of a pH less than 2, maintaining the temperature during the mixing of the two solutions and the resultant setting of the gel below approximately 95° F., washing the resultant gel until the pH of the wash water is within the range of about 2.0 to 5.0, drying the washed silica gel to obtain a product with a moisture content within the range of about 10 to about 16% by weight, activating the washed and partially dried gel by subjecting it to a series of at least two activation and washing treatments with an aqueous activating solution comprising an 0.05 to 1.0 molar solution of a hydrolyzable aluminum salt, each activation treatment being followed by washing to increase the pH of the gel, said washing being conducted so that after the first washing following the first activation the pH of the effluent wash water is within the range of approximately 2.8 to approximately 3.4, and after the second washing following the second activation the pH of the effluent wash water is within the range of approximately 3.0 to approximately 4.0, and drying the activated gel to a moisture content below about 10%.

4. In a process for the preparation of an activated silica metal oxide catalyst which comprises forming a hydrous silica gel by the addition of a solution of sodium silicate which has a concentration within the range of approximately 15° to 28° Baumé gravity to a solution of a mineral acid in slight stoichiometric excess sufficient to produce a gel of a pH less than 2, maintaining the temperature during the mixing of the two solutions and the resultant setting of the gel below approximately 95° F., washing the resultant silica gel until the pH of the wash water is within the range of about 2.0 to 5.0, drying the washed silica gel to obtain a product with a moisture content within the range of about 10 to 16 per cent by weight, activating the washed and partially dried gel by subjecting it to at least two activation and washing treatments with an aqueous activating solution comprising an 0.05 to 1.0 molar solution of a hydrolyzable salt of a metal selected from groups IIIB and IVA of the periodic system, each activation treatment being followed by washing to increase the pH of the gel, said washing being conducted so that after the first washing following the first activation the pH of the effluent wash water is within the range of approximately 2.8 to approximately 3.4, and after the second washing following the second activation the pH of the effluent wash water is within the range of approximately 3.0 to approximately 4.0, and drying the activated gel to a moisture content below about 10 per cent.

CHARLES C. CHAPMAN.
HURSHEL V. HENDRIX.

REFERENCES CITED

The following references are of record in the file of this patent:

UNITED STATES PATENTS

| Number | Name | Date |
| --- | --- | --- |
| 1,674,558 | Miller | June 19, 1928 |
| 1,695,740 | Patrick | Dec. 18, 1928 |
| 1,748,315 | Stoewener | Feb. 25, 1930 |
| 1,798,766 | Stoewener | Mar. 31, 1931 |
| 1,896,055 | Patrick | Jan. 31, 1933 |
| 2,068,016 | Gayer | Jan. 19, 1937 |
| 2,142,324 | McKinney | Jan. 3, 1939 |
| 2,147,985 | McKinney | Feb. 21, 1939 |
| 2,215,305 | Voorhies | Sept. 17, 1940 |
| 2,229,353 | Thomas | Jan. 21, 1941 |
| 2,257,157 | Connolly | Sept. 20, 1941 |
| 2,258,786 | Melaven | Oct. 14, 1941 |
| 2,258,787 | Melaven | Oct. 14, 1941 |
| 2,265,389 | Melaven | Dec. 9, 1941 |
| 2,270,812 | Melaven et al. | Jan. 20, 1942 |
| 2,320,799 | Ruthruff | June 1, 1943 |
| 2,342,196 | Hendrix et al. | Feb. 22, 1944 |